(No Model.)
8 Sheets—Sheet 3.

H. F. PARKER.
MACHINE FOR MOLDING PLASTIC MATERIAL.

No. 495,228. Patented Apr. 11, 1893.

*Fig. 4*

WITNESSES:
Chas. Hanimann
W. B. Harris

INVENTOR
Henry F. Parker.

(No Model.) 8 Sheets—Sheet 4.

H. F. PARKER.
MACHINE FOR MOLDING PLASTIC MATERIAL.

No. 495,228. Patented Apr. 11, 1893.

WITNESSES:
Chas. Hanimann
M. B. Harris

INVENTOR
Henry F. Parker (No Model.) 8 Sheets—Sheet 5.

H. F. PARKER.
MACHINE FOR MOLDING PLASTIC MATERIAL.

No. 495,228. Patented Apr. 11, 1893.

WITNESSES:
Chas. Hanimann
N. B. Harris

INVENTOR
Henry F. Parker

THE NORRIS PETERS CO., PHOTO-LITHO., WASHINGTON, D. C.

(No Model.) 8 Sheets—Sheet 6.
H. F. PARKER.
MACHINE FOR MOLDING PLASTIC MATERIAL.
No. 495,228. Patented Apr. 11, 1893.

(No Model.) 8 Sheets—Sheet 7.
H. F. PARKER.
MACHINE FOR MOLDING PLASTIC MATERIAL.
No. 495,228. Patented Apr. 11, 1893.

WITNESSES:
Chas. Hanimann
M. B. Harris

INVENTOR
Henry F. Parker (No Model.) 8 Sheets—Sheet 8.

H. F. PARKER.
MACHINE FOR MOLDING PLASTIC MATERIAL.

No. 495,228. Patented Apr. 11, 1893.

WITNESSES: Chas. Hanimann, M. B. Harris

INVENTOR: Henry F. Parker

UNITED STATES PATENT OFFICE.

HENRY F. PARKER, OF NEW YORK, N. Y.

MACHINE FOR MOLDING PLASTIC MATERIAL.

SPECIFICATION forming part of Letters Patent No. 495,228, dated April 11, 1893.

Application filed January 12, 1893. Serial No. 458,115. (No model.)

*To all whom it may concern:*

Be it known that I, HENRY F. PARKER, a citizen of the United States, residing in the city, county, and State of New York, have invented certain new and useful Improvements in Machines for Molding Plastic Material, of which the following is a specification.

This invention is adapted for the manufacture of articles compressed from plastic material which is required to remain for a period in the mold after compression in order to solidify; and said invention is especially adapted to the manufacture of composition targets.

The object of the invention is to mold the articles with rapidity and uniformity, and give ample time for solidifying them before they are ejected from the molds, while the mechanism in the nature of its construction may be concentrated, and operates uninterruptedly.

The invention consists in a molding press embodying a rotary carriage, carrying a series of mold blocks, which are individually rotative and bear each a plurality of molds, and in mechanism for compressing the plastic material into the molds in said blocks, and for feeding the said material thereto, also for cooling the material by the circulation of water supplied to the mold blocks in the carriage, and also in various novel mechanical devices for actuating the carriage, the compressing rams, and the feed pumps which supply the material to the molds, and in certain other novel characteristics.

In order to enable others skilled in the art to which my invention appertains to understand and use the same, I will proceed to describe suitable details of construction adapted for carrying the said invention into practice, explain its operation, and subsequently point out in the appended claims its novel characteristics.

Referring to the accompanying drawings, in which similar characters of reference indicate corresponding parts throughout the several views: Fig. 9, is a detail view of a part of the main rotary shaft 23, showing the segmental toothed beveled pinion in section, which operates to revolve the carriage intermittently. Fig. 10, is a cross section of Fig. 9, taken at $z^2-z^2$. Fig. 11, is a cross section of Fig. 9, taken at $x^3-x^3$, showing one of the locking segments for the rotary carriage, and also a part of the locking flange. Fig. 12, is an inverted plan view of the main toothed beveled gear detached from the carriage, and also the locking flange; and Fig. 13, a cross section of Fig. 12, taken on the line $y^3-y^3$. Fig. 14, is a plan view of the tumbling ring for the mold blocks. Fig. 15, is a cross section in Fig. 14, taken at $z^3-z^3$, also showing one of the tumbling wheels of the mold blocks in connection therewith detached. Fig. 16, is a plan view of the locking ring for the mold blocks, and Fig. 17, a cross section of Fig. 16, taken at $x^4-x^4$, showing also one of the locking disks of the mold blocks in connection therewith detached.

Figure 7:
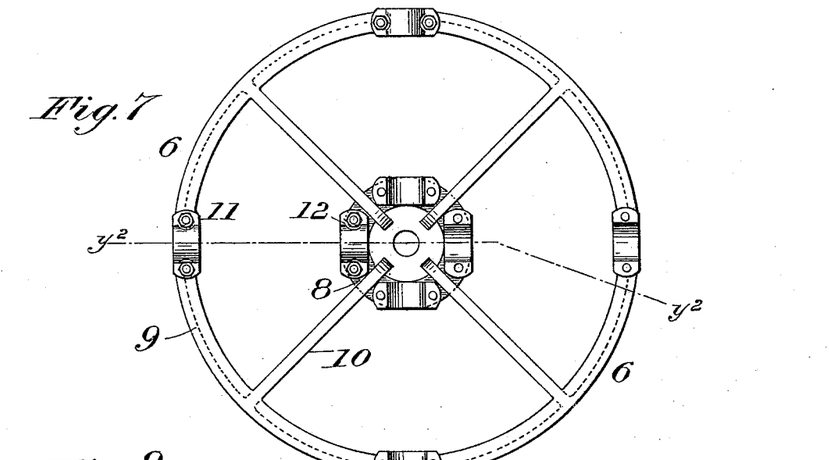
Fig. 7, is a plan view of the rotary carriage or turret frame, and Fig. 8, a cross section of Fig. 7, taken on the line $y^2-y^2$.
Figure 8:
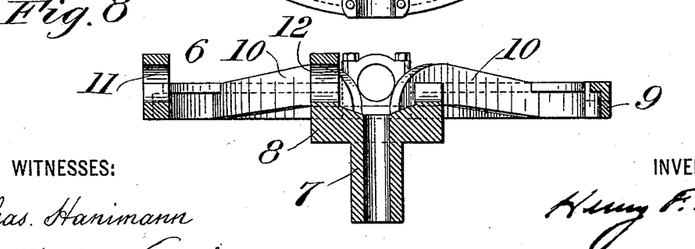

Referring to Figs. 1 to 17, inclusive, 1, 1, represent the lower sections of the side frames of the machine; 2, 2, the upper sections thereof; 3, the crown connecting the frames together at the top, and 4, 4, the cross frames connecting the lower parts of the side frames together. 5, is the saddle also connecting the side frames together and supporting the rotary carriage 6, which is pivoted in said saddle by means of the pintle 7, projecting from the hub of said carriage, as clearly shown in Fig. 8.

Figure 18:
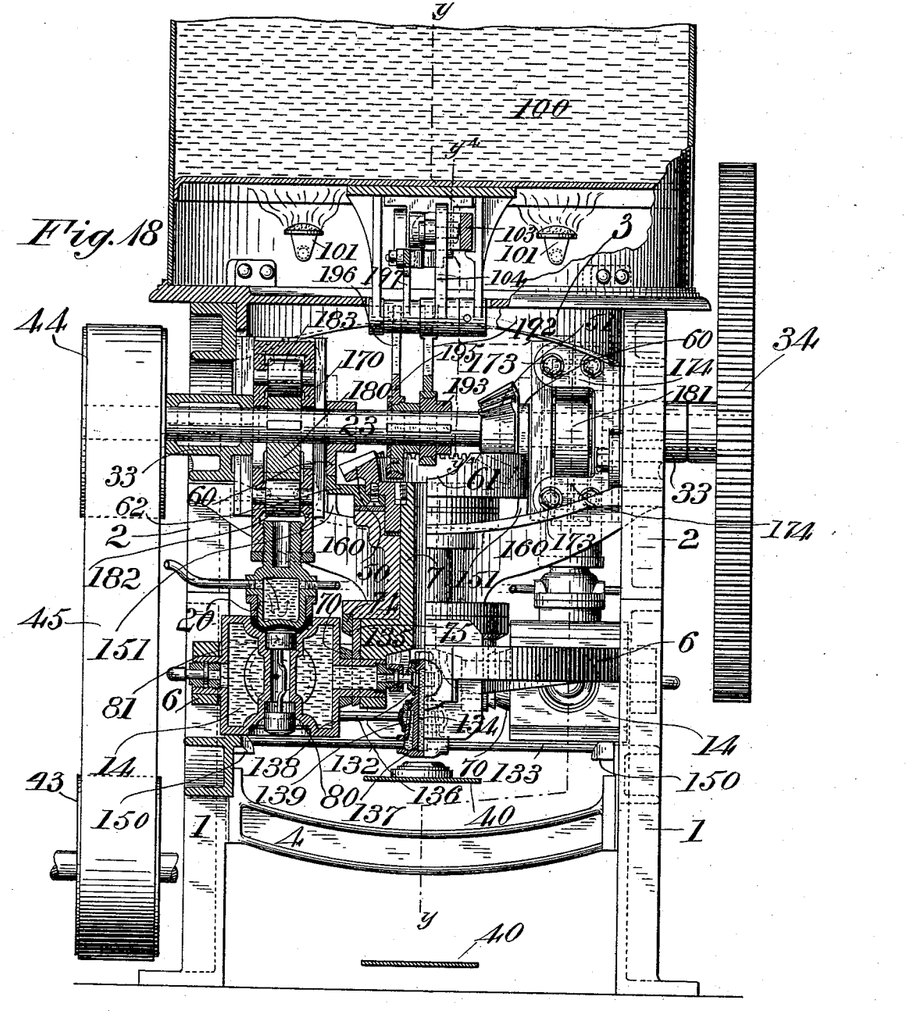
Fig. 18, is a front elevation illustrating a modified construction and shown partly in section on the line $x-x$, Fig. 19.
Figures 19, 20:
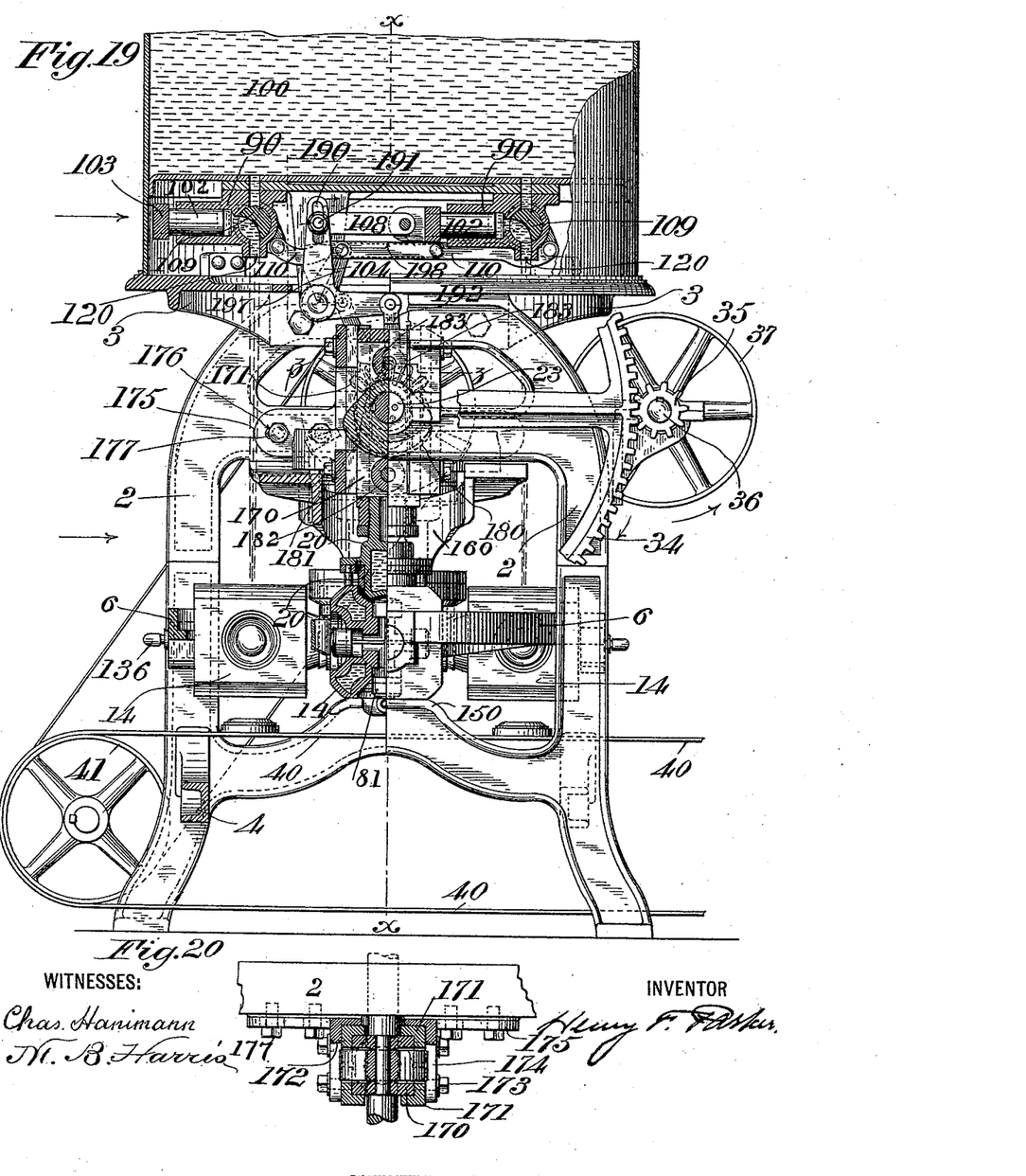
Fig. 19, is a side elevation of said modification shown partly in section on the lines $y-y$, Fig. 18.
Fig. 20, is a detail view of said modification showing a horizontal section at $z-z$, Fig. 19.
Figure 21:
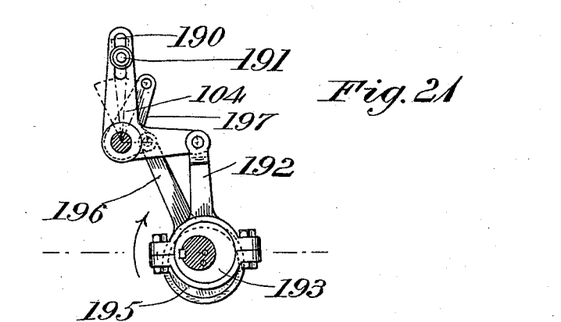
Fig. 21, is a detail view of said modification taken at $y^4-y^4$, Fig. 18, showing a part of the actuating mechanism for the supply pumps and their valves.

The carriage 6, consists in a spider frame, or wheel, comprising a hub 8, a rim 9, and spokes or webs 10, as shown in Figs. 7 and 8. The hub 8, and rim 9, of the carriage, have bearings 11 and 12, respectively, in which the rotary mold-blocks 14, are trunnioned individually, and means are provided for intermittently rotating said mold blocks on their trunnions at certain intervals in the intermittent rotation of the carriage 6, and means are also provided for locking the blocks 14, in a secure position of alignment with the compressing rams 20, and for supporting said mold blocks so as to resist the pressure of said rams without straining the frame of the carriage 6, or the pintle 7, as hereinafter described. The rams 20, are mounted in a reciprocating cross-head 21, sliding in guides 22, in the upper frames 2, 2, of the machine. The carriage 6, is rotated, and the cross-head 21, reciprocated by means of the main rotary shaft 23, which in the instance of Figs. 1 and 2, is located beneath the carriage, and in the instance of Figs. 18 and 19, is located above the carriage, and the details of the mechanism for intermittently rotating the carriage 6, are substantially similar throughout the drawings.

Figure 1:
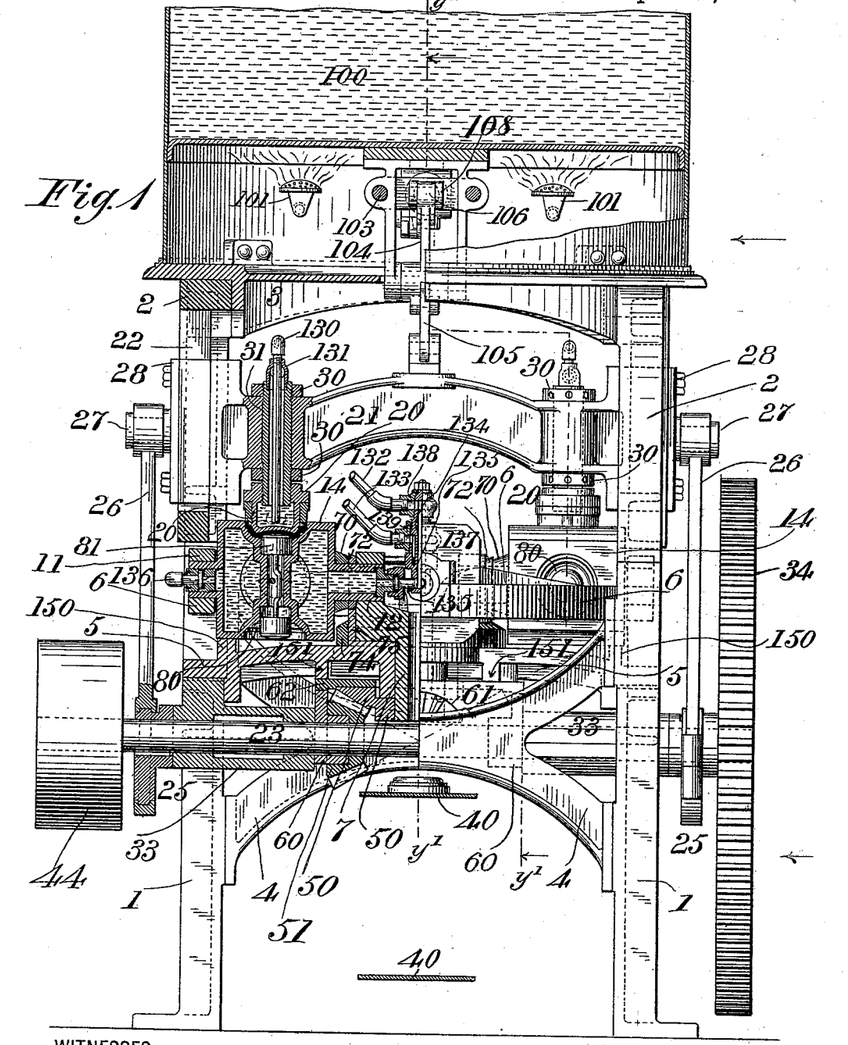
Figure 1, is a front elevation partly shown in section on the line $x'-x'$, Fig. 2.
Figure 2:
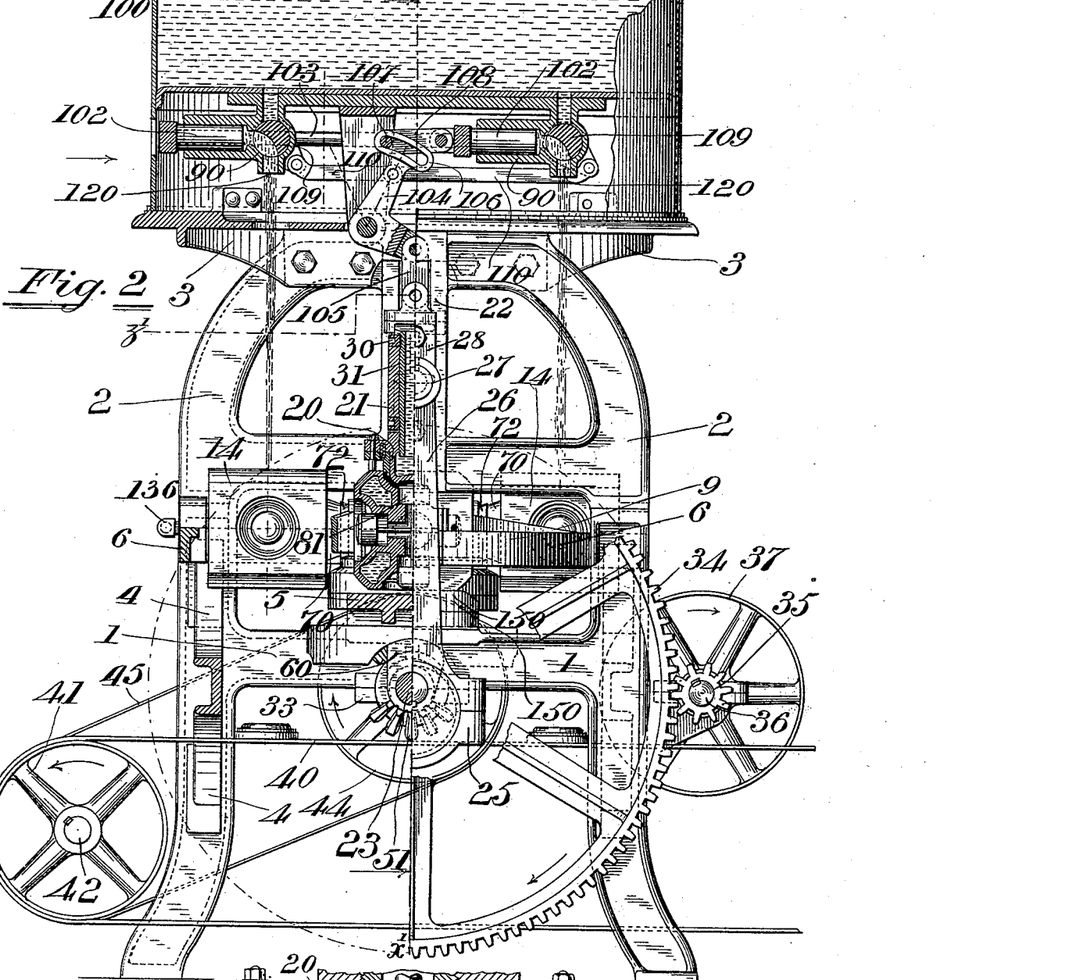
Fig. 2, a side elevation shown partly in section on the line $y'-y'$, Fig. 1.
Figure 4:
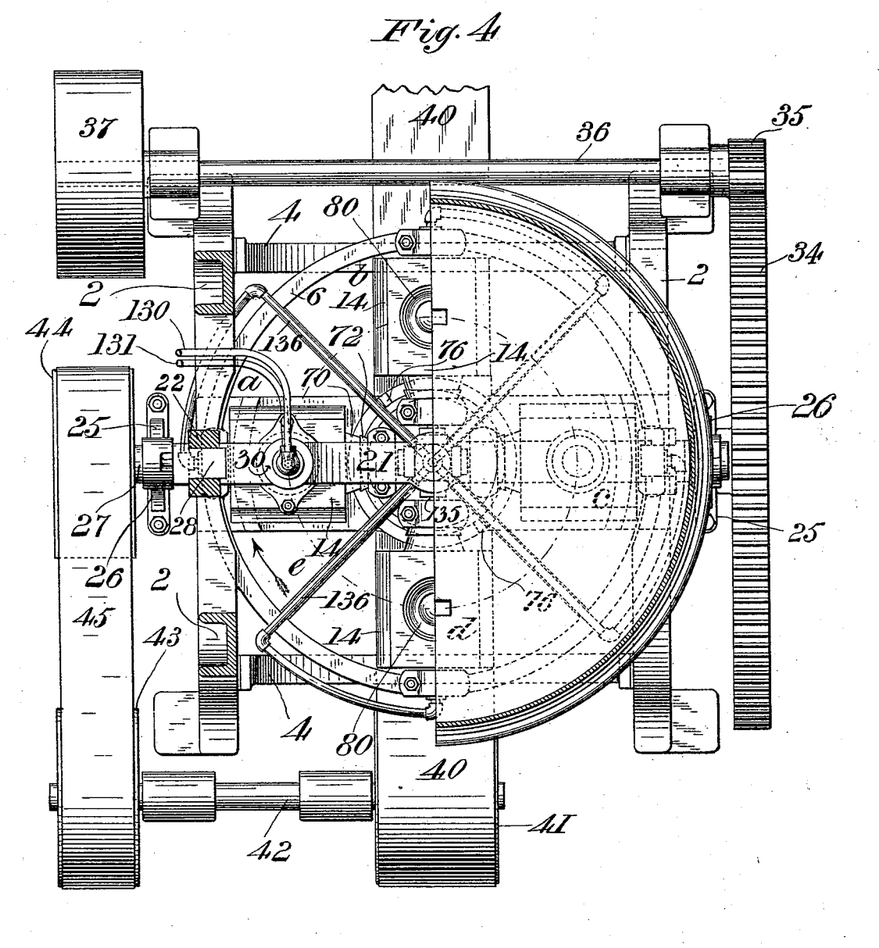
Fig. 4, a plan view of the machine shown partly in horizontal section on the line $z'-z'$, Fig. 2.

In Figs. 1, 2 and 4, eccentrics 25, are provided upon the shaft 23, at either side of the machine, having their rods 26, 26, pivoted to the cross-head pins 27, 27, fixed to the gibs 28, 28, of the cross-head 21, which gibs are constructed as seen in Fig. 4, forming the guides proper, bolted to the said cross-head in such manner that when the said gibs 28 are removed, the cross-head may be readily taken out from between the side frames 2, 2, of the machine.

The rams 20, are adjustably mounted in the cross-head 21, and the vertical adjustment of said rams may be determined with accuracy with reference to the mold blocks 14, by means of the nuts 30, screw-threaded to the stocks 31 of the rams, as indicated in Fig. 1, and also in Fig. 2.

The shaft 23, is journaled in bearings 33, mounted in the frames 1, 1, and is driven by means of the spur gear 34, with which the driving pinion 35, mounted on the counter-shaft 36, intermeshes.

The machine is driven by a belt placed upon the driving pulley 37.

Beneath the machine, and vertically beneath the part of the orbit of rotation of the mold-blocks 14, at which the finished articles are ejected, a conveying belt 40, is provided, adapted to receive two targets at a time ejected from opposite mold-blocks simultaneously, and this belt 40, is driven at the proper gradual speed by means of the pulley 41, shaft 42, pulley 43, and pulley 44, on the shaft 23, belted to said pulley 43, by the belt 45. The diameters of the pulleys 41, 43, are equal, and the diameter of the pulley 44, is such that the distance of travel of the belt 40, between the intervals of dropping the targets thereon, shall be equal to twice the distance between the centers of the molds of the opposite mold-blocks 14, 14. The finished articles are thereby distributed on the belt 40, at equal distances consecutively, in convenient position for delivery to any automatic machinery that may be required for subsequent operations.

Figures 9, 10, 11, 12, 13, 14, 15, 16, 17:
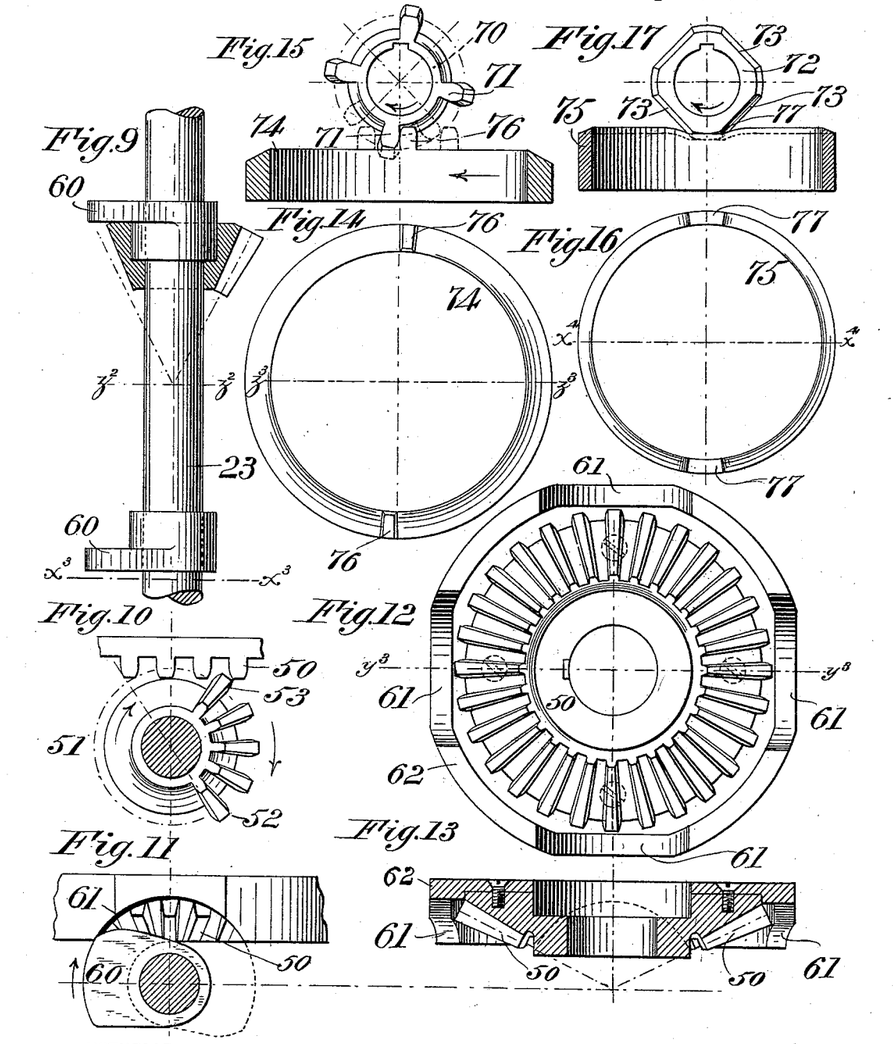

To the pintle 7, of the carriage 6, is securely attached a bevel gear 50, whereby said carriage is intermittently rotated at every revolution of the mutilated, or segmental, beveled pinion 51, which, as seen in Fig. 10, bears gear teeth at a part of its circumference, and of such relative number to the gear teeth of the gear 50, that the leading tooth 52, shall re-engage with the teeth of said gear 50, at precisely half a revolution of said pinion 51, after the last tooth 53, thereof has ceased to revolve the gear 50. There are two locking segments 60, upon the shaft 23, both of which simultaneously enter the recesses 61, on diametrically opposite sides of the locking flange 62, secured to the gear 50, and the entrance of said locking segments 60, into the recesses 61, occurs as in Fig. 11, at the instant when the last tooth 53, of the pinion 51, ceases to revolve the gear 50, as in Fig. 10. After the pinion has rotated a half turn from the position in Fig. 10, so that the leading tooth 52, thereon shall engage with the tooth of the gear 50, which it touches, the locking segments 60, shall have reached a position indicated by dotted lines in Fig. 11, wherein they release the flange 62, permitting the continued rotation of the carriage 6. The same operation is repeated for each diametrically opposite set of recesses 61, as the motion of the machine continues; the carriage 6, being revolved a quarter revolution for each complete revolution of the shaft 23. Owing to the entrance of the segments 60, simultaneously into the opposite recesses 61, the carriage is securely locked against displacement in either rotative direction at the instant when the leading edges of said segments have contact with the flange 62.

Figure 5:
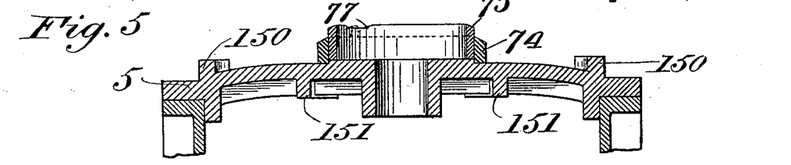
Fig. 5, is a detail view, showing the saddle which supports the rotary carriage, taken in section, on the line $x^2-x^2$, of Fig. 6, and Fig. 6, a plan view of the said saddle.
Figure 6:
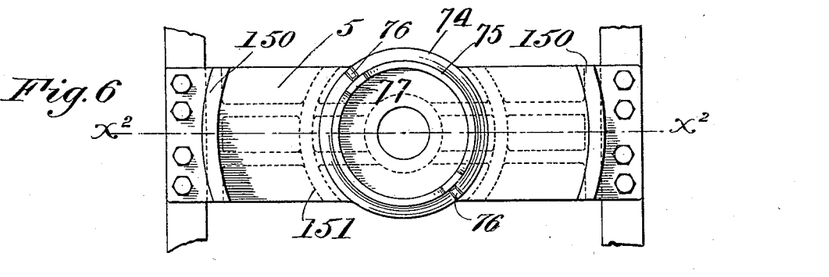

The inner trunnion of each mold-block 14, is provided with a tumbling wheel 70, having four teeth 71, as seen in Fig. 15, and also a locking wheel 72, having four flat surfaces 73, as seen in Fig. 17, and there are affixed upon the saddle 5, in the relation shown in Figs. 5 and 6, a tumbling ring 74, and a locking ring 75. The tumbling ring 74, bears two diametrically opposite teeth 76, and the locking ring 75, bears two diametrically opposite recesses 77, corresponding in position to the said teeth, so that each time a mold-block 14, passes from the position $a$, to the position $b$, (see Fig. 4) or from the position $c$, to the position $d$, it is rotated a quarter turn upon its trunnion, so as to present a different mold 80 at its uppermost side at each said partial rotation.

The tumbling wheel 70, and the locking wheel 72, are shown in Figs. 15 and 17, in the act of tumbling the mold block, and when the mold block has been rotated to the desired extent upon its own axis, the tooth 71, passes off from the tooth 76, while the flattened surface 73, of the locking wheel 72, rides upon the flattened edge of the locking ring 75, preventing the displacement of the mold block from its position thus acquired. The positions of the teeth 76, with reference to the other parts of the machine are indicated in Fig. 4. When the mold blocks 14, pass from the position $b$, to $c$, or $d$, to $a$, they remain non-rotative upon their own axes, for reasons which will hereinafter appear. The eccentrics 25, 25, are so adjusted that the compressing rams 20, are advanced upon the mold, while the carriage 6, is stationary, and while the toothless portion of the segmental pinion 51, is passing the gear 50, the rams then being retired in proper time to clear the mold blocks when the carriage begins its further rotation.

Interior to the mold blocks 14, the molds 80, are provided centrally with the ejectors 81, coupled together, operating by gravity, so as to cast off the finished article when the mold containing it arrives at a position undermost as the said block rotates. This event occurs as each block 14, arrives at the position $b$ or $d$, above the belt 40, as seen in Fig. 4.

The supply pumps 90, are provided communicating beneath the tank 100, in which the composition is kept in a liquid state by the heat derived from suitable gasoline burners, indicated at 101, Fig. 1, or other suitable heating apparatus, and the said supply pumps 90, have plungers 102, connected together by a yoke 103, (see Fig. 23) which yoke is actuated by means of the right angle rock arm 104, connected at one of its extremities to the cross head 21, by means of the link 105, and at its other extremity having a segmentally slotted head 106, within which plays the pin 107, upon the end of the link 108, pivoted to the said yoke 103, and to the upper part of the arm 104, the rock arms of the three-way valves 109 are connected by means of the connecting rods 110. The segmentally slotted head 106, of the rock arm 104, admits of lost motion, so that the valves 109, may be moved a part of their stroke before the plungers 102, commence their motion in either direction; that of suction or that of discharge, and the valves 109, thereby assume a proper preparatory position for establishing communication between the plungers and the tank 100, or between the said plungers and the outlets 120, which are located vertically above the molds 80, at positions $b$, and $d$, Fig. 4, so that the composition may be gravitated therein by the operation of the pumps. The discharge motion of the plungers 102 in their cylinders is produced by the descent of the cross-head 21, while the material previously supplied is being pressed in the molds in the positions $a$, $c$, by the rams 20, and the cylinders of the plungers 102, are refilled by the retraction of the latter when the cross head rises, and during the time when the mold blocks 14, are being moved on the carriage from one position to another. The interiors of the rams 20, are supplied with cold water circulation through suitable pipes 130, 131, as indicated in Fig. 1, having flexible connections with suitable supply and discharge pipes. The interiors of the mold blocks 14, are supplied with cold water circulation from pipes 132, 133, connected through independent channels in the rotary water joint 134, and the nipples 135, and the return pipes 136 (see Fig. 4). The outer ends of the return pipes 136, connect with the outer trunnions of the mold blocks in the manner indicated in Figs. 1 and 4, and the connections of the nipples 135, and pipes 136, with the mold blocks, are made by means of watertight rotary joints, suitably packed in the manner indicated.

Figure 3:
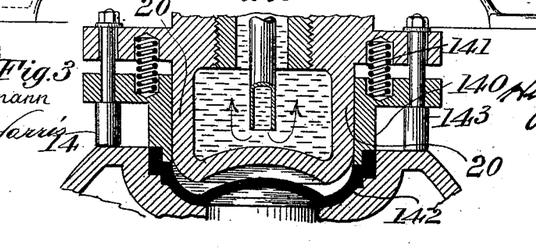
Fig. 3, an enlarged sectional view showing a construction of one of the compressing rams, corresponding in plane of section to that taken in Fig. 2, and in a different position.

The construction of the heads of the rams 20, as illustrated in Fig. 3, does not constitute a novel feature of the invention, but is illustrated merely to show the operation of the cast-off collar 140, which is thrust downward by means of springs 141, when the cam rises after performing its work, so as to strip the finished target 142, from the face of the ram. The studs 143, limit the entrance of the collar 140, into the molds of the block 14, and also prevent the said collar from dropping off.

In order to support the mold block 14, when the compression of the ram thereon occurs, skids 150, are provided upon the saddle 5, at each side thereof, as indicated in Fig. 1, also in Fig. 2, and at Figs. 5 and 6, upon which the flat surface of each block rides as it passes, by the rotation of the carriage 6, in the direction indicated by the arrow $e$, in Fig. 4, from the position $d$ to $a$, or from $b$ to $c$, and after the mold blocks have arrived upon the skids 150, they are securely locked against rotative displacement upon their trunnions, and the strain of compression is entirely relieved from the outer rim 9, of the carriage 6. The under side of the saddle 5, is moreover provided with skids 151, which are designed to confine the top of the flange plate 62, at the points beneath which the locking segments 60, enter into the recesses 61, so that the said flangeplate, which is made separate from the gear 50, as seen in Fig. 13, may not be displaced therefrom by any upward strain resulting from the abutment of the said segments 60, thereon. The interposition of the flange-plate 62, between the segment 60 and the skid 151, is clearly illustrated in section in Fig. 1. The skids 151, also appear on the top of the inverted saddle 160 in Fig. 18, between said saddle and the under surface of the locking flange plate 62.

Figures 22, 23:
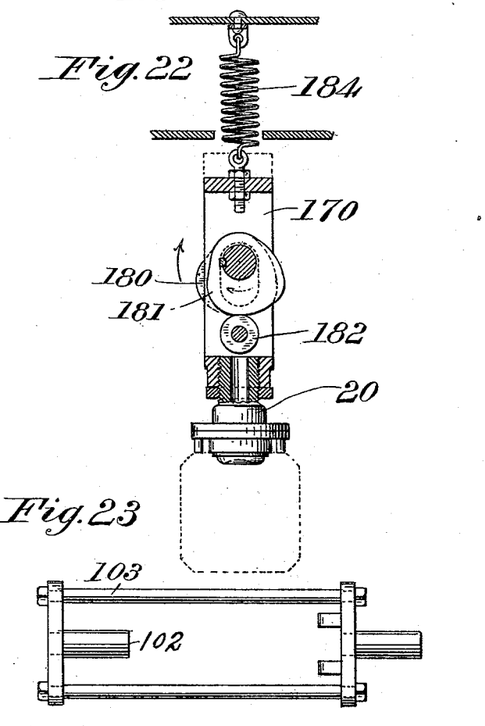
Fig. 22, is a detail view showing one of the rams with its sliding head corresponding in character to that shown in Figs. 18 and 19, in section, with certain modifications illustrating the relative positions in which the two cams pertaining to the respective rams may be adjusted in order to distribute the resistance of the work.
Fig. 23, is a detail view showing the plunger yoke for the supply pump corresponding to the construction in Figs. 1 and 2.
Figure 24:
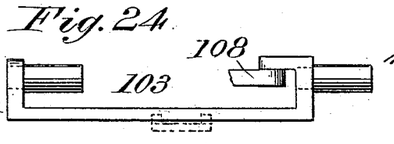
Fig. 24, is a detail view showing the plunger yoke corresponding to the construction in Figs. 18 and 19.

Referring now to Figs. 18 to 21, inclusive, the rotary carriage 6, and mold blocks 14, therein, of similar construction, as hereinbefore described with reference to Fig. 1, are inverted, and the actuating mechanism therefor placed above instead of beneath the carriage, so that the said mold blocks may be located in closer proximity to the conveying belt 40, and the finished article, while still in a somewhat plastic state, may be less liable to become distorted or injured by the drop from the blocks to the belt when ejected. The description of the details of the carriage and block-actuating mechanism given with reference to Figs. 1 to 17, applies also to Figs. 18 and 19, excepting in the matter of the construction of the saddle 160, which is bolted to the upper frames 2, 2, in lieu of the frames 1, 1. The rams 20, are mounted in sliding heads 170, which are movable in guides 171, arranged in brackets 172, so that they may be adjusted to take up wear, or to gage the ram 20, in accurate vertical alignment with the molds 80, at their stopping point. Each guide 171, consists of four gibs, designated by the same numeral, each being adjusted by means of screw-studs 173, in the lugs 174, of the brackets 172, that are in turn bolted to the said frames 2, 2, by means of lugs 175. The lugs 175, have elongated slots 176, whereby they are adjustable toward or from the sliding heads 170, when the bolts 177, are loosened, and may then be clamped securely after the rams have been adjusted. The sliding heads 170, of the rams are actuated by means of cams 180, 181, upon the main shaft 23, journaled in bearings 33, in this instance mounted upon the upper frames 2, 2. In order to minimize friction, the cams 180, 181, operate on anti-friction rollers 182, 183, and the rollers 183, may be omitted if desired, and their function performed by the substitution of elevating springs 184, in the manner indicated in Fig. 22. Furthermore, the cams 180, 181, may be set so as to perform the work of compression in succession, as also indicated in Fig. 22, and avoid the climax of resistance on both rams occurring at one time. The employment of cams for actuating the rams affords the advantage of a quick descending motion and a long dwell while the work is being pressed and cooled, and a rapid ascending motion to give clearance to the mold blocks, so that the rotation of the carriage 6, may immediately commence after the compression has been performed. The rotary water-joint 134, shown in Fig. 18, differs from that shown in Fig. 1, in that the pipes 132, 133, are connected to the stationary core 137, of the joint, while the nipples 135 and the carriage pipes 126, are connected with the collars 138, 139, respectively, which are rotary, while in said Fig. 1, the pipes 132, 133, are connected to the collars 138, 139, which are stationary, the core 137 rotating with the carriage. The supply pumps 90, in Fig. 19, have their plungers connected by a yoke 103, corresponding to that shown in detail in Fig. 24, actuated through the link 108, by the right angle rock arm 104, containing a vertical slot 190, in which the pivoting stud 191, of said link is vertically adjustable, for the purpose of adjusting the length of stroke and delivering capacity of the plungers 102; the said stud 191 being securely clamped when adjusted. The lower branch of the rock arm 104, is connected to the rod 192, of the plunger eccentric 193, upon the main shaft 23, of the machine, while the valves 109, are actuated by means of a separate eccentric 195, connected by its rod 196, to an independent rock arm 197, to the upper extremity of which the respective valve rods 110, are connected by means of the link 198, indicated by dotted lines in Fig. 19. The gear 50, is concave at its upper side, as seen in Fig. 18, in order to give clearance to the eccentrics 193, 195, and the latter may be set or adjusted with convenience in reference to the other parts of the machine, so as to control the feed of the composition exactly as desired.

The operation of the machine is duplex throughout, the molten composition being gravitated into the mold blocks at positions $b$ and $d$, simultaneously. The composition in said mold blocks is then pressed in both simultaneously at positions $a$ and $c$, and then after they have each revolved a three-quarters part of the orbit of the carriage 6, the finished articles are discharged from said mold blocks simultaneously upon the belt 40. For instance, commencing at the position $d$, an up-turned mold 80, is filled with composition, and when the carriage 6, rotates the block passes from the position $d$, to $a$, without tumbling on its own individual axis, and is supported while the composition is being pressed by the descent of the ram 20. Upon the rising of the ram, the carriage 6, further advances, and while passing from the position $a$, to $b$, the said mold block is revolved or tumbled, upon its own axis a quarter of a revolution, so that the mold in which the first article has just been pressed is brought to the side of the block, but not discharged. After the succeeding mold 80, which is now up-turned beneath the filling devices at $b$, has been filled with composition, the carriage 6, is further rotated, but the block 14, remains stationary upon its individual axis; the first article aforesaid still remaining upon the side of the block. After the compression of the second article is effected at $c$, the carriage 6, further rotates a quarter revolution in its orbit, bringing the block 14, to the position $d$, while the said block during its passage from $c$, to $d$, has also revolved upon its individual axis a quarter revolution, causing the first article aforesaid to be discharged upon the belt 40, by means of the gravity ejector 81, hereinbefore described. Each article is, therefore, discharged at the same point in the orbit of the rotary carriage 6, at which its composition was first supplied, affording ample time for cooling and solidifying. There are sixteen molds within which eight targets are molded at each revolution of the carriage 6, and the capacity of the machine, as compared with those heretofore used for analogous purposes, is greatly increased.

Having thus fully described my invention, what I claim, and desire to secure by Letters Patent, is—

1. In a molding press, the combination of the rotary carriage, and a series of mold blocks carried thereby, and means to rotate each upon an individual axis, and means for supplying and compressing the material.

2. In a molding press, the combination of the rotary carriage, and a series of independently rotative mold blocks mounted therein, each containing a series of molds, and means for rotating said mold block and supplying and compressing the material.

3. In a molding press, the combination of the rotary carriage, and a series of mold blocks therein, each bearing a plurality of molds, and rotating upon axes radiating at right angles to the main axis of the said carriage, and means for rotating said blocks and supplying and compressing the composition in said molds.

4. In a molding press, the combination of the rotary carriage, a series of rotary mold blocks therein, and means, substantially as described, for rotating said carriage and blocks and for supplying water circulation thereto, for cooling the molds; said circulation being continuously supplied irrespective of the position of said carriage or mold blocks.

5. In a molding press, the combination of a rotary carriage, a series of rotary mold blocks mounted in the carriage in pairs, at diametrically opposite sides of said carriage, two rams for compressing the material in the molds located at diametrically opposite sides of the axis of said carriage, two filling devices for the composition located at two other diametrically opposite sides of the axis of said carriage, the said rams and filling devices adapted to operate simultaneously, and means for operating said carriage and blocks and rams and filling devices all substantially as described.

6. In a molding press, the combination of a rotary carriage, a series of independently rotative mold blocks therein, means for rotating the mold blocks individually by the intermittent rotation of said carriage, and means for supplying and compressing the composition.

7. In a molding press the combination of a rotary carriage, a series of independently rotative mold blocks mounted therein, means for intermittently rotating the carriage, means for individually rotating the mold blocks by the intermittent rotation of said carriage, means for locking the said carriage at its positions of stoppage, and means for locking the said rotary mold blocks at each stoppage of their individual rotation in the said carriage.

8. In a molding press, the combination of the rotary carriage having a vertical axis of rotation, a series of mold blocks mounted therein, having horizontal axes of rotation radiating from the axis of said carriage, each said mold block bearing a series of molds, and a compressing ram movable toward or from said mold blocks in a line parallel to the axis of said carriage.

9. In a molding press, the combination of a horizontal rotary carriage, a series of mold blocks mounted therein, and each containing a series of molds, a main driving shaft extending at right angles to the axis of rotation of the said carriage, a spur gear having a connection with the carriage, a segmental toothed pinion upon said driving shaft, engaging with the spur gear during a portion of the rotation of said shaft, a locking flange also connected to the carriage, and having diametrically opposite recesses, and two locking segments upon said shaft, adapted to enter two of said recesses on diametrically opposite sides of the axis of the carriage and lock the same at its stopping points, substantially as and for the purpose herein described.

10. In a molding press, the combination of a rotary carriage and means for revolving the same intermittently, a series of mold blocks, each bearing a series of molds, and trunnioned in said carriage upon axes of rotation radiating from its axis, a toothed tumbling wheel upon each mold block, a toothed ring for actuating said tumbling wheels, engaging with the latter at intervals in the orbital rotation of the mold blocks about the axis of said carriage, and means for locking the said mold blocks in non-rotative positions between the intervals of their said tumbling movements, substantially as described.

11. In a molding press, the combination of a rotary carriage, supported on a central pintle, a series of individually rotative mold blocks mounted on said carriage, each bearing a series of molds, and having flattened faces parallel with the plane of rotation of said carriage when the said blocks are stationary, a compressing ram moving in a line parallel with the axis of rotation of said carriage upon one side of the mold block, and upon the other side of said block a skid, substantially as described, for supporting it against rotative displacement, and for relieving the carriage from strain by the compression of the ram.

12. In a molding press, the combination of a rotary carriage, a series of rotary mold blocks mounted therein, each bearing a series of molds, means for intermittently rotating said carriage and said blocks in the manner described, two rams reciprocating in lines parallel with the axis of said carriage, on diametrically opposite sides thereof, and a main driving shaft transverse to said axis, bearing two cams for operating the said rams, substantially as described.

13. In a molding press, the combination of a rotary carriage, a series of rotary mold blocks mounted therein, each bearing a series of molds, means for intermittently rotating said carriage and said blocks in the manner described, two rams reciprocating in lines parallel with the axis of said carriage on diametrically opposite sides thereof, and a main driving shaft transverse to said axis bearing two cams for operating the said rams; the one cam being adjusted with reference to the other, so as to compress the material at immediately successive intervals, for the purpose described.

14. In a molding press, the combination with a rotary carriage, a series of rotary mold blocks mounted therein, compressing rams at two diametrically opposite sides of the axis of the carriage, supply pumps for the composition located on two other diametrically opposite sides of the said axis, a main rotary driving shaft transverse to said axis, and mechanism for transmitting motion from the said shaft to the said rams and to the said pumps at one part of its revolution, and mechanism for transmitting motion from the shaft to the said rotary carriage and its mold blocks at another part of the revolution of said shaft, for the purposes described.

15. The combination of the driving shaft 23, located above the carriage 6, the supply pumps 90, and their valves 109, and the eccentrics 193, 195 upon the said shaft 23, and means for transmitting motion from said eccentrics respectively to the said pumps and said valves, substantially as described.

HENRY F. PARKER.

Witnesses:
K. D. VAN PELT,
M. A. PALMER.